UNITED STATES PATENT OFFICE.

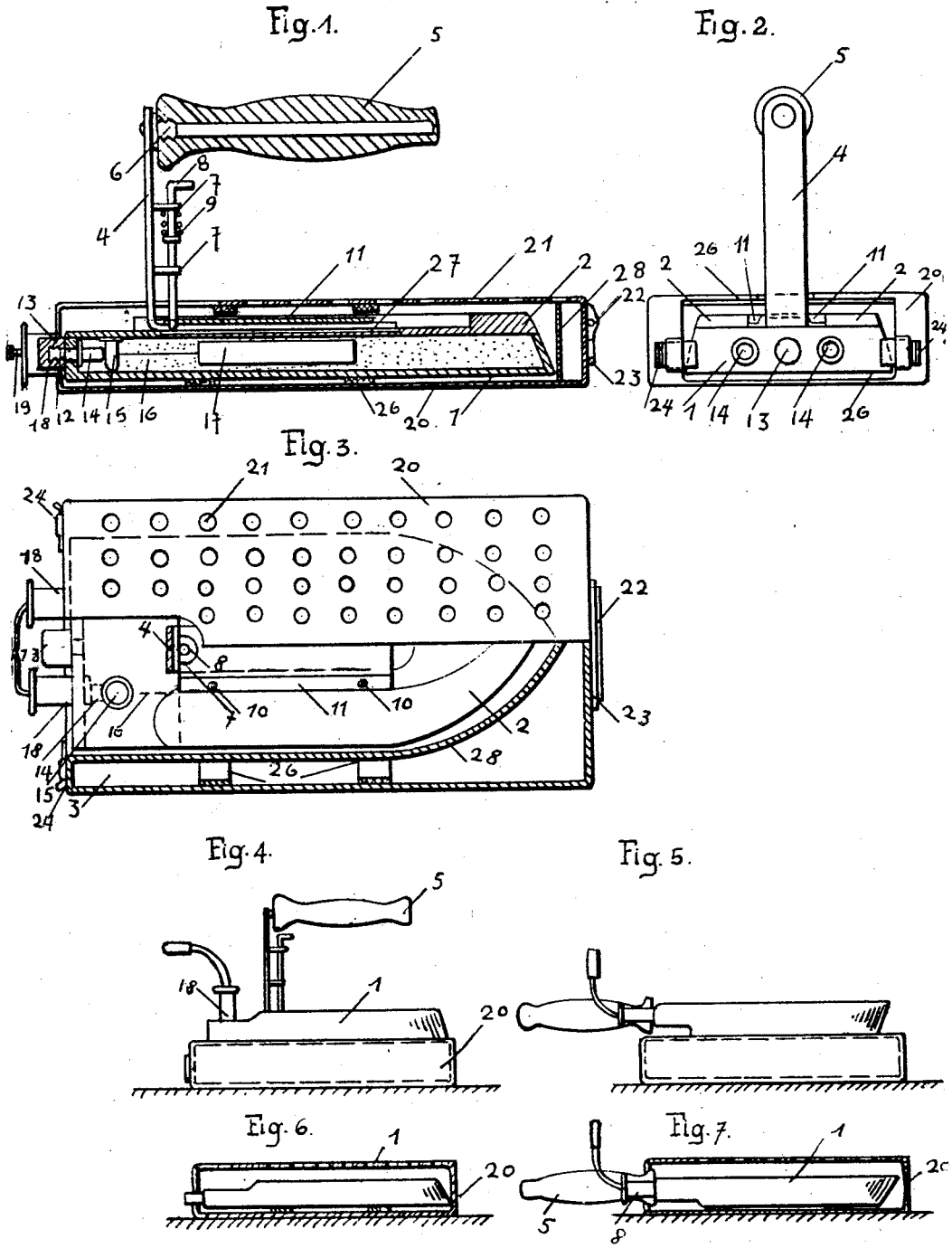

ERNST MUNTWYLER, OF LUCERNE, SWITZERLAND.

ELECTRIC HEATING APPARATUS.

1,402,246.      Specification of Letters Patent.      Patented Jan. 3, 1922.

Application filed September 13, 1920. Serial No. 410,005.

*To all whom it may concern:*

Be it known that I, ERNST MUNTWYLER, a citizen of the Republic of Switzerland, and resident of Lucerne, in the Canton of Lucerne, Switzerland, have invented new and useful Improvements in Electric Heating Apparatus, of which the following is a specification.

This invention has for its object an electric heating apparatus having a heating body and a housing for the same, the housing being adapted to be employed as a stand in the manner used with flat irons with the difference, however, that provision is made in the present device, firstly, of a handle which is capable of attachment at different sides of the heating body and, secondly, of different electric contacts also mounted on the said heating body. The apparatus is thus adapted for use with:

1. Flat irons, or
2. Chafing-dishes wherein the housing serves as a stand;
3. Foot-warmers, and
4. Bed-pans.

I have illustrated a desirable form in which my invention may be embodied in the accompanying drawing, in which:—

Fig. 1 shows a longitudinal sectional elevation of the whole apparatus;

Fig. 2 shows an end elevation, and

Fig. 3 shows a plan of Fig. 1, partly in section.

Fig. 4 shows an elevation of the heating apparatus when used as a flat iron;

Fig. 5 shows an elevation of the apparatus when employed as a chafing-dish;

Fig. 6 represents a longitudinal section through the apparatus when employed as a bed-pan, and Fig. 7 is a similar view with the apparatus, however, used as a foot-warmer.

Referring to Figs. 1 to 3 in the drawings, 1 is a hollow heating body in the form of a flat iron and provided with a cover 2 having a longitudinally disposed recess. Mounted within this recess and secured to the portion 27 of the body 1 by means of screws 10 are two guide bars 11 for the reception of one member of an angle plate 4 which, when the apparatus is used in connection with flat irons, is adapted to be secured by a bolt 8. The latter extends through eyelets 7 formed on the upright member of the plate 4 and is controlled by a spring 9 which tends to keep the bolt 8 in engagement with an opening arranged in the first member of the angle plate. The top of the said plate carries a pin 6 which in turn serves as a bearing for a handle 5. At the upper as well as the rear part of the heating body I mount insulating sleeves 15 and 14 respectively serving to receive contact pins 18 which can thus be fitted vertically or horizontally in relation to the heating body. These sleeves are connected with an electric heater 17 by means of wires 16. The aforementioned housing, designated by 20, is provided at its top with a series of apertures 21 and formed with an integral wall 28 which contains and approximately corresponds in outline with the heating body 1 and thus serves as a guide therefor. 26 are cross stays constructed of heat-insulating material and intended to support the heating body and safeguard the same from direct contact with the walls of the housing. 23 is a hoop pivoted at 22 to the housing, thus serving as a handle for the same.

According to Fig. 1 the heating body is slid from left to right into the housing 20. If now two sliding bolts 24 mounted at the end at opposite sides of the housing are slid into the position shown in the drawings, the heating body is prevented from accidental detachment or from falling out of the housing.

The heating body when employed as a flat iron, Fig. 4, is removed from the housing 20 which may then serve as a stand for the flat iron. In such case the contact pins 18 are fitted into the sleeves 15.

If the heating body is used in connection with chafing-dishes, Fig. 5, the angle plate 4 subsequent to its disengagement from the cover 2, which is effected by withdrawing the bolt 8 and by sliding the plate away from the guide bars 11, is removed. The handle 5 is likewise removed from the pin 6 and secured to another pin 12 mounted at the rear part of the heating body and ordinarily covered by a cap 13. The contact pins 18 remain untouched. In this case, too, the housing is made to serve as a stand for the heating body.

When the device is used as a bed-pan, Fig. 6, the angle plate 4 together with the handle 5 is removed and the heating body inserted into the housing. The said body, by applying the electric current is thereafter heated and the contact pins subsequently detached.

In the case of a foot-warmer, Fig. 7, the handle and contact pins are applied in the manner described with reference to the chafing-dish, the heating body however being inserted into the housing which is then closed by the bolts 24. In this way the heating body may again be connected with the electrical source and, owing to the handle, is adapted easily to be carried about in heated condition.

Having now fully described my said invention what I claim and desire to secure by Letters Patent is:—

The combination with the herein-described hollow housing and stand, of a hollow heating body in the form of a flat iron mounted within the housing and having a cover with a longitudinally disposed recess therein, an electric heater fitted in said hollow heating body, guide bars secured within the recess of the cover, an angle-plate mounted at the top of the heating body the vertical member of such angle plate projecting from the housing and the horizontal member being guided by the said guide bars, a handle detachably secured to the top part of the vertical member of the angle-plate, means to attach the angle-plate to and detach it from the heating body, means to detach the handle from the said vertical member and fix it to the rear part of the heating body, insulating sleeves mounted at the upper and rear parts of the heating body, electric wires connecting the sleeves with the aforesaid electric heater, and contact pins adapted to be fitted in anyone of the insulating sleeves, all substantially as and for the purpose set forth.

In testimony whereof I have hereunto set my hand in the presence of two subscribing witnesses.

ERNST MUNTWYLER.

Witnesses:
FRITZ PLUSCHER,
M. C. GRUTER.